Dec. 15, 1970  F. C. WERNER  3,546,770
COOKIE CUTTER DIE CONSTRUCTION AND
METHOD OF MAKING THE SAME
Filed May 31, 1968  2 Sheets-Sheet 1
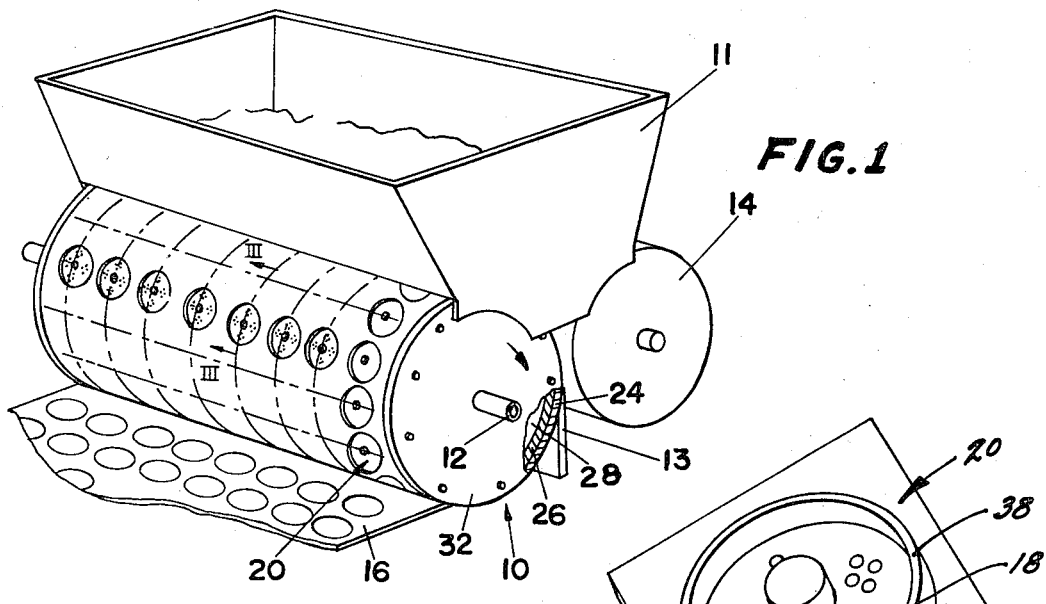
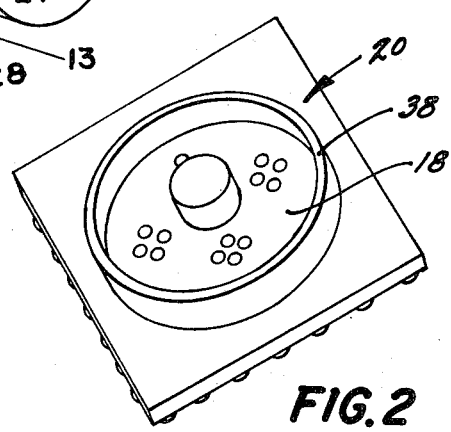
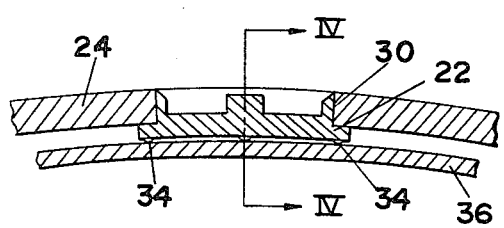
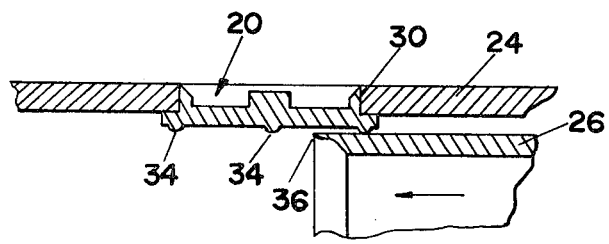
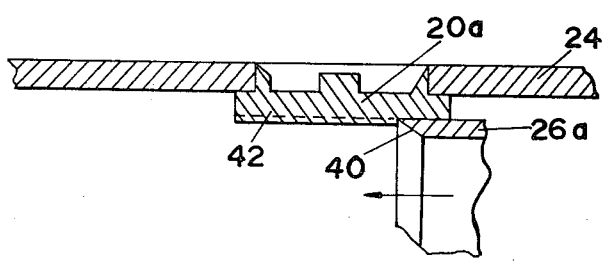
INVENTOR.
FRANK C. WERNER
BY *Price, Heneveld,*
*Huizenga & Cooper*
ATTORNEYS Dec. 15, 1970  F. C. WERNER  3,546,770
COOKIE CUTTER DIE CONSTRUCTION AND
METHOD OF MAKING THE SAME
Filed May 31, 1968  2 Sheets-Sheet 2

INVENTOR.
FRANK C. WERNER
BY
ATTORNEYS

United States Patent Office 3,546,770
Patented Dec. 15, 1970

1

3,546,770
COOKIE CUTTER DIE CONSTRUCTION AND METHOD OF MAKING THE SAME
Frank C. Werner, Grand Rapids, Mich., assignor to Werner Machinery Company, Grand Rapids, Mich., a corporation of Michigan
Filed May 31, 1968, Ser. No. 733,683
Int. Cl. A21c *11/08;* B23p *11/00*
U.S. Cl. 29—429                    8 Claims

ABSTRACT OF THE DISCLOSURE

A die construction for cutting cookies in which die inserts are held in openings in an outer tubular cylindrical drum by an inner cylindrical drum. The die inserts have flanges which are positioned between the outer and inner drums and the bottoms of the flanges have inwardly extending burrs which compensate for any tolerance between the flanges and the inner drum so that the flanges are maintained tightly against the inner wall of the outer tubular cylindrical drum. The inner drum has a sharpened end which on axial insertion into the outer drum—die inserts subassembly modifies the inner surface of the inserts to correct tolerance variations between the several parts and to provide for a tight assembly.

---

This invention relates to a die construction. In one of its aspects, it relates to a rotational cookie die assembly having a tubular cylindrical drum; a plurality of configurated cookie forming die inserts retained in the periphery of the tubular drum in a pattern to die form cookie dough with rotation of the drum on a central axis, each insert being positioned in a respective tubular drum opening of substantially the same size as the insert, wherein the inserts have laterally extending flanges with upper surfaces generally conforming to the inner surface of the drum, the flanges having inwardly extending burrs on the underside thereof and an inner cylindrical drum positioned in the tubular cylindrical drum and in forcing relationship with the inserts, the outer surface of the inner drum in contact with the burrs to force the flanges against the inner surface of the tubular cylindrical drum.

In another of its aspects, the invention relates to a method of making dies for cookies and the like wherein the die inserts containing retaining means are positioned with a cylindrical tubular drum, and an inner cylindrical drum is positioned within the tubular cylindrical drum to hold the retaining means against the inner surface of the tubular drum, the method characterized in that inwardly extending burrs are provided on the bottom portions of the die inserts, and the burrs are deformed to conform to the external surface of the inner drum as the inner drum is positioned within the tubular drum.

Rotational dies such as disclosed and claimed in U.S. Pat. 3,302,592 are used for cutting cookie dough for making of cookies from sheet material. These dies must be replaced when they become worn and the construction of the die must prevent the forcing of dough between the dies and the supporting cylinders.

I have now discovered an improved die construction in which die insert retaining means are held tightly against the inner surface of a tubular cylinder by an inner supporting drum, spaced radially inwardly of the tubular cylinder. Preferably burrs are provided on the bottom of the die inserts, which burrs are deformed to conform to the outer surface of the inner supporting drum as the inner supporting drum is inserted into the central area of the tubular cylindrical drum.

By various aspects of this invention one or more of the following, or other, objects can be obtained.

2

It is an object of this invention to provide an improved die construction for cutting cookies and the like in which flowing of dough material into the crevices between the die inserts and supporting drums is minimized.

It is a further object of this invention to provide an improved die construction in which the parts of the die can be manufactured inexpensively and the die can be constructed rapidly with close fits between the parts.

Other aspects, objects, and the several advantages of this invention are apparent to one skilled in the art from a study of this disclosure, the drawings, and the appended claims.

According to the invention, a rotational cookie die assembly is provided. A tubular cylindrical drum having a rotational axle means on its central axis is provided with a plurality of configurated cookie forming die inserts retained in the periphery of the tubular drum in a pattern to die form cookie dough with rotation of the drum on the axis. Each of the die inserts has a curved outer surface area and a peripheral surface flush with the outer surface of the tubular drum and each insert is positioned in a respective tubular drum opening substantially the same size as the insert. The insert has retaining means such as a bottom laterally extending flange with upper surfaces generally conforming to the inner surface of the drum. Each of the flanges contains depending burrs on the inner portions thereof, which burrs are pressed firmly against an inner cylindrical drum which holds the dies in place. The burrs are severed and deformed to proper tolerances as the inner cylindrical drum is positioned within the tubular cylindrical drum.

The invention will now be described with reference to the accompanying drawings in which:

FIG. 1 is a schematic representation of an embodiment of the invention;

FIG. 2 is a perspective view of a die insert to be positioned within the apparatus shown in FIG. 1;

FIG. 3 is a sectional view of a portion of the circumference of the drum shown in FIG. 1;

FIG. 4 is a view taken along lines IV—IV of FIG. 3, showing the method of forming the burrs to the proper distances as the inner supporting drum is inserted into the central area of the outer tubular cylindrical drum;

FIG. 5 is a view similar to FIG. 4, showing an alternate method of forming the cookie die assembly;

Figure 6:
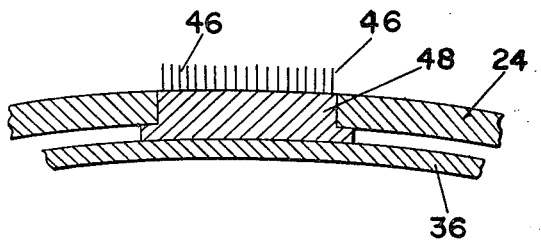
FIG. 6 is an illustration of an embodiment of the invention wherein the die inserts contain cookie cutters, the view being similar to FIG. 3.

Referring to the drawings in which like numerals have been used to designate like parts, the novel cookie die drum 10 is rotatably mounted on a suitable axis means 12. The drum cooperates with a pressure roller 14, to squeeze cookie dough passing through hopper 11 therebetween, thereby pressing the dough into each of the plurality of female die cavities 18 in inserts 20 which are retained flush in the periphery of the drum. The excess dough is scraped from drum 10 by a knife blade 13 so that excess dough can be returned to the hopper 11. Each of these inserts has a selected relief pattern on the face of cavity 18 to provide a desired face pattern on the cookie to be formed. The dough within cavities 18 is deposited on sheet 16 and passed to an oven for baking.

The cookie die drum 10 is formed from an outer tubular, cylindrical drum 24 constructed of brass, and an inner cylindrical drum 26 constructed of steel and positioned in concentric relationship. The drums are secured together through end caps 32 suitably attached to the inner cylindrical drum 26 and/or the outer tubular cylindrical drum 24. A hollow interior portion 28 is formed within the interior cylindrical drum 26.

The die inserts 20 constructed of metal contain an upstanding side wall 38 which is approximately the size of openings 30 in the outer tubular cylindrical drum 24. The die inserts 20 contain a base flange 22 having an upper surface which generally conforms to the inner surface of drum 24. The bottom or inner portion of the base flange 22 contains a plurality of inwardly extending burrs 34 which contact the inner drum 26. The burrs 34 take up any tolerances between the inner face of base flange 22 and the outer face of inner drum 26 so that a tight relationship can be maintained between the top portion of base flange 22 and the inner face of drum 24.

One method of assembling the die assembly is shown schematically in FIG. 4. The die inserts are positioned in the openings 30 of drum 24. The inner drum has a sharpened edge 36 which deforms the burrs 34 to the proper tolerance between the drum 26 and the burrs 34. In this manner, the tight fit can be obtained between the inner supporting drum and the die inserts 20.

Another method of assembling a modified die assembly is shown in FIG. 5 wherein burrs are eliminated from the bottom surface of the die inserts. Instead, the reamer or shear ring 40 is mounted on the forward leading edge of cylinder 26a. Thus, reamer ring 40 is sufficiently sharp to shave off a small layer 42 of the surface 41 of insert 20a as the cylinder 26a is inserted. As a result a tight fit is obtained between the cylinder 26a and surface 41 of insert 20a.

Thus, the construction provides for loose tolerances in the manufacture of the inner and outer drums but with tight fitting parts due to the burrs 34. Further by the simple construction, the dies when worn, are easily replaceable. The inner drums are easily removed and the dies 20 merely slip out of the openings 30.

In FIG. 6, the inserts 48 have a plurality of upstanding prongs 46 projecting from the outer surface and above outer surface of drum 24. The inserts can be used in cutting cracker dough for breaking areas in the baked crackers.

Figure 7:
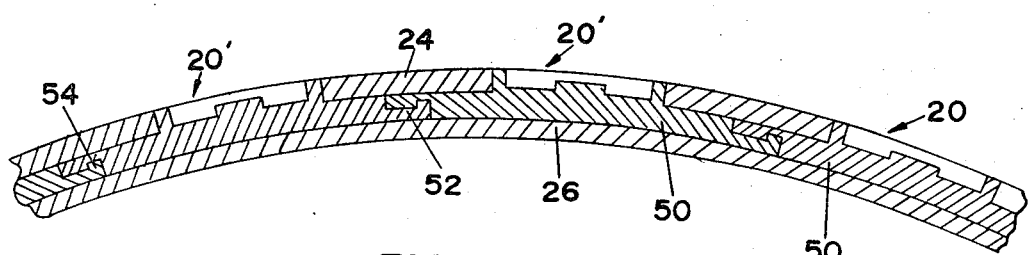
FIG. 7 is a illustration of another embodiment, the view being similar to FIGS. 3 and 6.

In FIG. 7, each of the die inserts 20' have interlocking slots on the base flanges 50. One edge of each flange has an upwardly opening slot 52 and an opposite edge has a downwardly openings slot 54. The slots are so shaped so as to interlock as illustrated to make a complete interlocked ring. The interlocking ring prevents twisting of the die inserts relative to the drum 24 and prevents dough from leaking into the central portion of the drum assembly.

Figure 8:
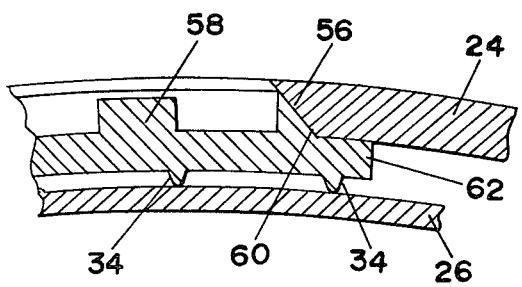
FIG. 8 is an illustration of still another embodiment of the invention, the view being similar to FIGS. 3, 6, and 8.

In the embodiment illustrated in FIG. 8, the drum 24 has inwardly slanting undercut surfaces 56. The die insert 58 has an upwardly and outwardly slanting surface 60 which mates with surface 56. Flanges 62 are forced against the inner wall of drum 24. The surface 60 terminates at the upper end of surface 56.

The use of the undercut surface 56 reduces wear on the top edges of the die inserts 58. Frequently, the die inserts are made from a softer material than the drum 24. The outermost portions of the die inserts usually receive the most wear. By the embodiment shown in FIG. 8, the wear on the outermost portion of the die inserts is transferred to the more wear resistant drum 24.

The undercut surface construction of FIG. 8 further reduces the propensity of dough to be forced between the drum 24 and the die inserts because the dough is not forced directly down on the joint between the die insert and the drum 24.

Reasonable variations and modifications are possible within the scope of the foregoing disclosure, the drawings, and the appended claims without departing from the spirit of the invention.

The embodiments of the invention in which an exclusive property or privilege is claimed are defined as follows:

1. In a rotational cookie die assembly comprising: a tubular cylindrical drum having rotational axle means on its central axis; a plurality of die inserts retained in the periphery of said drum in a pattern to die form cookie dough with rotation of said drum on said axis, each insert being positioned in a respective opening substantially the same size as said insert, the improvement which comprises:
   said inserts having laterally extending flanges extending beyond the edges of said openings with upper surfaces of said flanges generally conforming to and abutting the inner surface of said drum, at least adjacent said openings; and
   an inner cylindrical drum positioned in said tubular cylindrical drum and in forcing relationship with said inserts forcing said insert flanges tightly against said inner surface of the tubular cylindrical drum.

2. The assembly of claim 1 in which burrs are provided on the surface of said die opposite the upper surfaces of said flanges which abut against the tubular drum, and said inner drum abuts against said burrs.

3. A cookie die assembly according to claim 2 wherein means are provided on said inner cylindrical drum for cutting said burrs flush with the outer surface of said inner cylindrical drum to conform to the tolerances between said inner drum and said flanges as said inner cylindrical drum is inserted within said cylindrical drum with said inserts positioned within said drum openings, whereby said upper surface of the flanges of said inserts are maintained firmly positioned against said inner surface of said tubular cylindrical drum.

4. A rotational die assembly according to claim 1 wherein said inserts contain cutting means extending out of the plane of the outer surface of said tubular cylindrical drum.

5. A rotational die assembly according to claim 1 wherein said flanges have means which interlock with adjacent flanges to prevent rotation of said die relative to said tubular cylindrical drum.

6. A rotational die assembly according to claim 1 wherein said openings have inwardly slanted undercut surfaces, said inserts have upwardly slanting surfaces which mate with said inwardly slanted undercut surfaces and terminate at the upper end of said undercut surfaces whereby wear on said die inserts is materially reduced.

7. In a method of making dies for cookies and the like, wherein die inserts are positioned within openings of a cylindrical tubular drum; the steps comprising: providing die inserts with flanges extending beyond the edges of said openings and positioning said inserts in said openings with the flanges inside the drum; providing a second drum of a diameter slightly greater than the distance between bottom portions of opposite die inserts, and cutting said die inserts to conform to the external surface of the inner cylindrical drum as said inner cylindrical drum is positioned within said outer cylindrical tubular drum.

8. The method of claim 7 in which the die inserts are provided with inwardly extending burrs on the bottom portions thereof and said second drum cuts through portions of said burrs.

References Cited

UNITED STATES PATENTS 2,081,724   5/1937   Abbott _____ 107—68X
3,302,592   2/1967   Werner _____ 107—68

LAVERNE D. GEIGER, Primary Examiner

R. I. SMITH, Assistant Examiner

U.S. Cl. X.R.

107—68